(12) United States Patent
Uberti et al.

(10) Patent No.: US 7,841,253 B2
(45) Date of Patent: Nov. 30, 2010

(54) SERVO-ASSISTED GEARSHIFT CONTROL DEVICE FOR A MOTOR-VEHICLE DUAL-CLUTCH TRANSMISSION

(75) Inventors: Maurizio Uberti, Turin (IT); Valter Pastorello, Turin (IT); Carlo Emilio Baret, Orbassano (IT); Gian Luigi Pregnolato, Orbassano (IT); Marco Garabello, Orbassano (IT); Dario Caenazzo, Orbassano (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 297 days.

(21) Appl. No.: 12/032,167

(22) Filed: Feb. 15, 2008

(65) Prior Publication Data

US 2008/0210031 A1 Sep. 4, 2008

(30) Foreign Application Priority Data

Mar. 1, 2007 (EP) .................................. 07425115

(51) Int. Cl.
*F16H 59/00* (2006.01)
(52) U.S. Cl. ...................................................... 74/335
(58) Field of Classification Search .................. 74/331, 74/335, 339, 606 R
See application file for complete search history.

(56) References Cited

U.S. PATENT DOCUMENTS 7,127,961 B2 * 10/2006 Braford et al. ................ 74/340
7,464,618 B2 * 12/2008 Mohlmann et al. ............ 74/346
2006/0005647 A1    1/2006 Braford et al.
2006/0185458 A1 *  8/2006 Gerlofs et al. ................ 74/335
2008/0210032 A1 *  9/2008 Uberti et al. .................. 74/335

FOREIGN PATENT DOCUMENTS

| EP | 1 216 371 B1 | 6/2002 |
| EP | 1 398 544 A2 | 3/2004 |
| EP | 1 411 279 A2 | 4/2004 |
| GB | 2 105 419 A  | 3/1983 |
| GB | 2 179 712 A  | 3/1987 |

\* cited by examiner

*Primary Examiner*—Dirk Wright
(74) *Attorney, Agent, or Firm*—Sughrue Mion, PLLC

(57) ABSTRACT

The device comprises four shift forks, each slidable among a first engagement position, a second engagement position and an intermediate neutral position between the two engagement positions, and an operating unit comprising four double-acting hydraulic actuators identical to each other and arranged to control each the displacement of a respective shift fork among the two engagement positions and the neutral position. The operating unit further comprises a support plate having holes for fixing to the gear case, and an actuator block accommodating the hydraulic actuators. The support plate and the actuator block are integrated to form a single body. In the assembled condition of the operating unit on the gear case, the actuator block is disposed on the side of the support plate facing towards the inside of the gear case.

8 Claims, 5 Drawing Sheets

SERVO-ASSISTED GEARSHIFT CONTROL DEVICE FOR A MOTOR-VEHICLE DUAL-CLUTCH TRANSMISSION

BACKGROUND OF THE INVENTION

The present invention relates in general to a motor-vehicle dual-clutch transmission with six or seven forward gears and reverse gear, and more specifically to a servo-assisted gearshift control device for a transmission of this type.

A gearshift control device for a robotized gearbox, in particular for a gearbox with six forward gears, is known from European Patent EP-B-1 216 371 and comprises four shift forks, each of which is slidably mounted along a respective stationary rod fixed to the gear case so as be alternatively movable to first and second engagement positions, each corresponding to the engagement of a respective gear, eight single-acting hydraulic actuators associated in pairs to each fork to control the movement thereof to the first or second engagement positions, and a hydraulic control circuit for controlling the eight hydraulic actuators independently of each other. More particularly, the two hydraulic actuators associated to each shift fork are arranged on opposite sides with respect to a nose of the fork which extends perpendicularly to the corresponding rod and act on that nose to move the fork to the first or second engagement positions.

This known gearshift control device has the advantage of allowing to control the hydraulic actuators independently of each other, but it has however the shortcoming of requiring a great number of components, since two hydraulic actuators are provided for each shift fork.

SUMMARY OF THE INVENTION

It is therefore an object of the invention to provide a servo-assisted gearshift control device for a motor-vehicle dual-clutch transmission with six or seven forward gears and reverse gear, which has a smaller number of components than the prior art, which makes it possible to carry out in "power-shift" mode and in non-sequential mode all the multiple gear changes allowed by the transmission architecture, which can be used as such when converting a dual-clutch transmission into a single-clutch robotized transmission without requiring changes either to the gear case or to the gearshift forks, and which further allows to maintain the same gear case and the same gearshift forks when converting a motor-vehicle dual-clutch transmission into a single-clutch manual transmission.

This and other objects are fully achieved according to the invention by virtue of a servo-assisted control device for a motor-vehicle dual-clutch transmission as defined in independent claim 1.

Further advantageous characteristics of the invention are set forth in the dependent claims.

BRIEF DESCRIPTION OF THE DRAWINGS

The characteristics and the advantages of the invention will become apparent from the detailed description which follows, given purely by way of non-limiting example with reference to the appended drawings, in which.

DETAILED DESCRIPTION OF THE PREFERRED EMBODIMENTS

Figure 1:
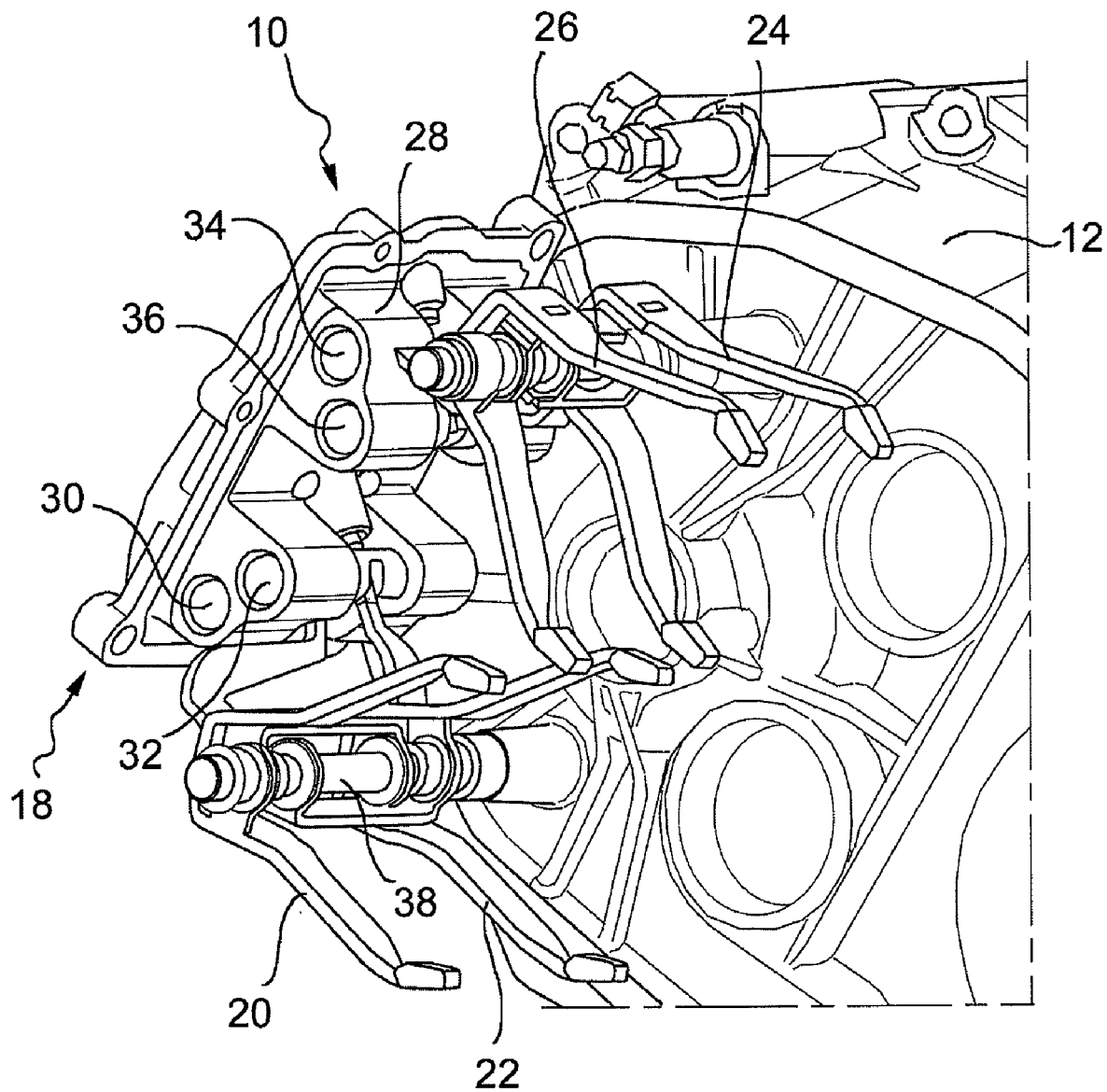
FIG. 1 is a perspective view which shows a servo-assisted gearshift control device for a motor-vehicle dual-clutch transmission with six or seven forward gears and reverse gear according to a preferred embodiment of the invention.
Figure 2:
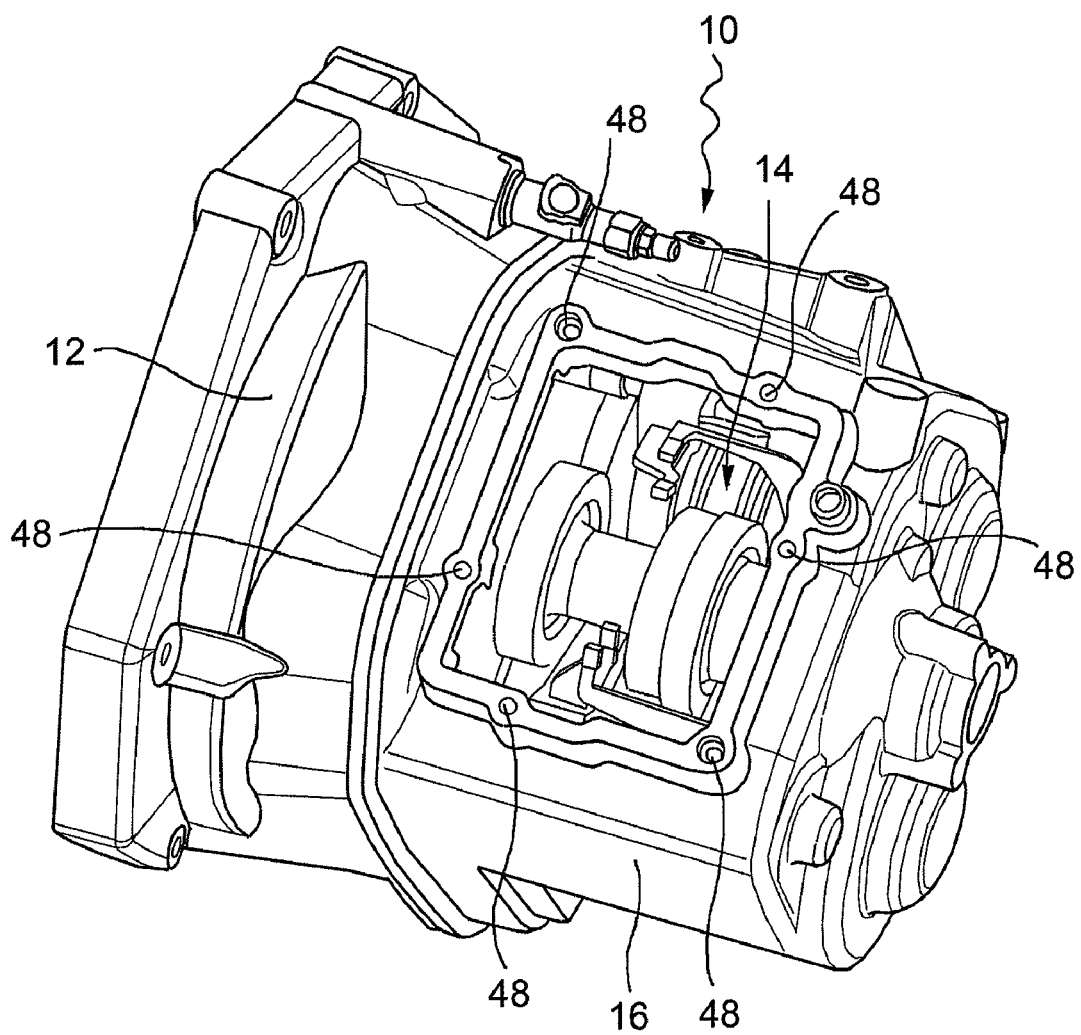
FIG. 2 is a perspective view which shows the gear case of a motor-vehicle dual-clutch transmission with six or seven forward gears and reverse gear, from which the control device of FIG. 1 has been removed.

With reference first to FIGS. 1 and 2, a motor-vehicle dual-clutch transmission with six or seven forward gears and reverse gear is generally indicated 10 and comprises a clutch unit (not shown) housed in a casing 12, and a gearbox 14 (which can be partially seen in FIG. 2) housed in a gear case 16. The gearbox 14 includes, in per-se-known manner, two coaxial input shafts (not shown) and two output shafts (also not shown) arranged parallel to the two input shafts and carrying a plurality of idle gear wheels (not shown) which can be coupled for rotation each with the respective output shaft by means of four engagement sliding sleeves (also not shown), three of which are always associated to two gears while the remainder is associated to one gear only or to two gears depending on the gearbox having six or seven forward gears, respectively.

Figure 5:
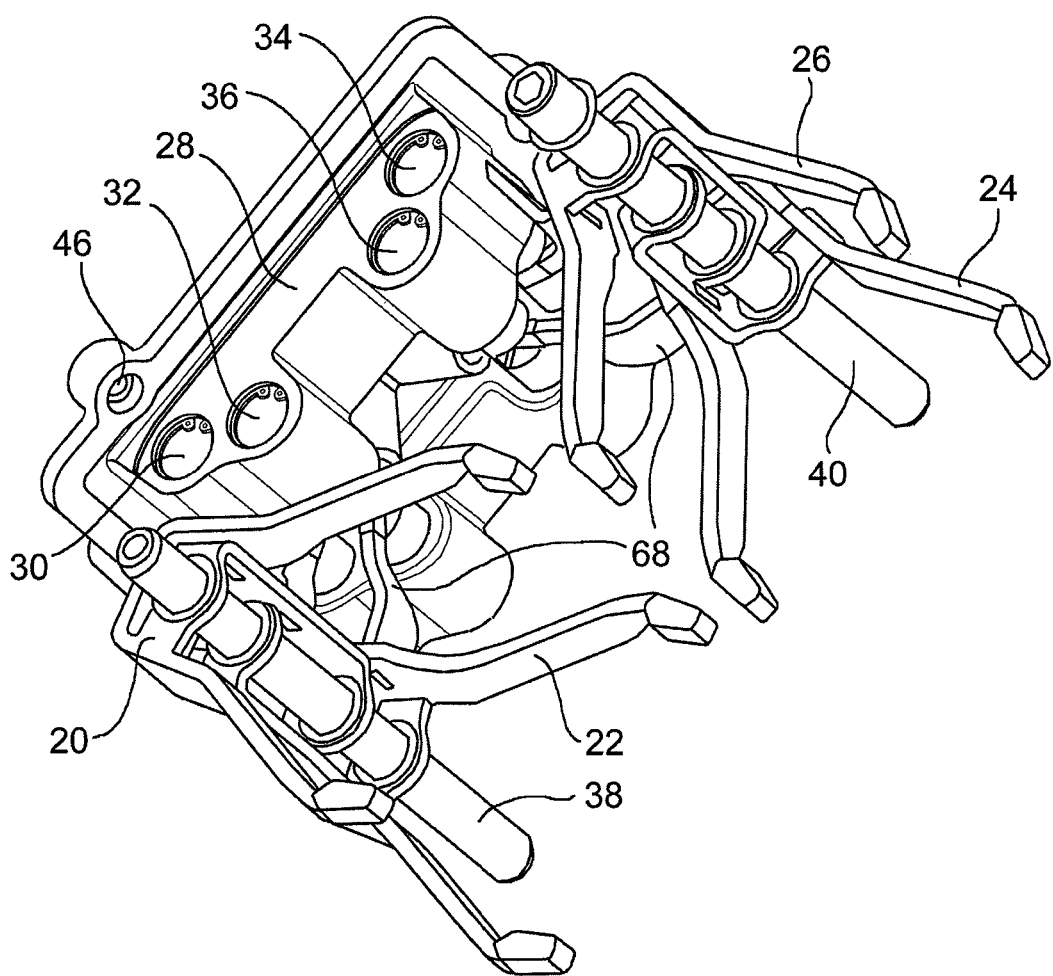
FIGS. 5 and 6 are a perspective view and a front view, respectively, of the operating unit and of the shift forks of the control device of FIG. 1.
Figure 6:
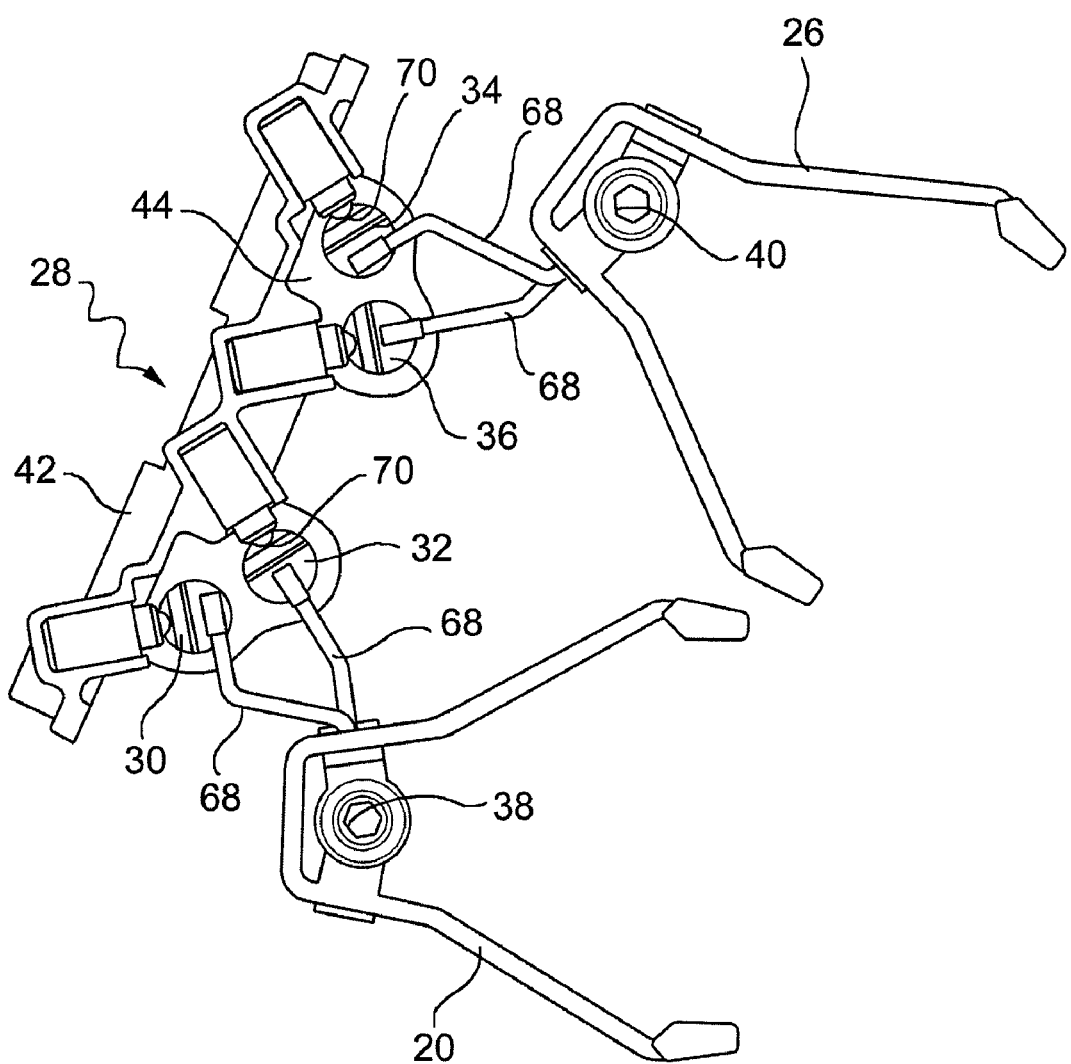

The displacement of the engagement sliding sleeves for the engagement of the different gears of the gearbox is controlled by a servo-assisted gearshift control device, generally indicated 18 in FIG. 1. The control device 18 basically includes four shift forks denoted by the reference numerals 20, 22, 24 and 26, respectively, and an operating unit 28 comprising four double-acting hydraulic actuators, identical to each other, denoted by the reference numerals 30, 32, 34 and 36, respectively. The actuator 30 is arranged to control the displacement of the shift fork 20, the actuator 32 is arranged to control the displacement of the shift fork 22, the actuator 34 is arranged to control the displacement of the shift fork 24 and the actuator 36 is arranged to control the displacement of the shift fork 26. In the illustrated embodiment, the shift forks are mounted in pairs on two stationary rods 38 and 40 of the gearbox (which can be better seen in FIG. 5) orientated parallel to the output shafts. More specifically, the two shift forks 20 and 22 are slidably mounted on the rod 38, while the other two shift forks 24 and 26 are slidably mounted on the rod 40. The shift forks 20, 22, 24 and 26 illustrated in the figures are advantageously formed according to the teaching of the non-published European Patent Application N. 06425148.1 in the Applicant's name, that is to say, with identical bodies suitably shaped to allow a partially overlapping arrangement of each pair of shift forks mounted on the same rod. It is however clear that the shift forks may have any other configuration.

Figure 3:
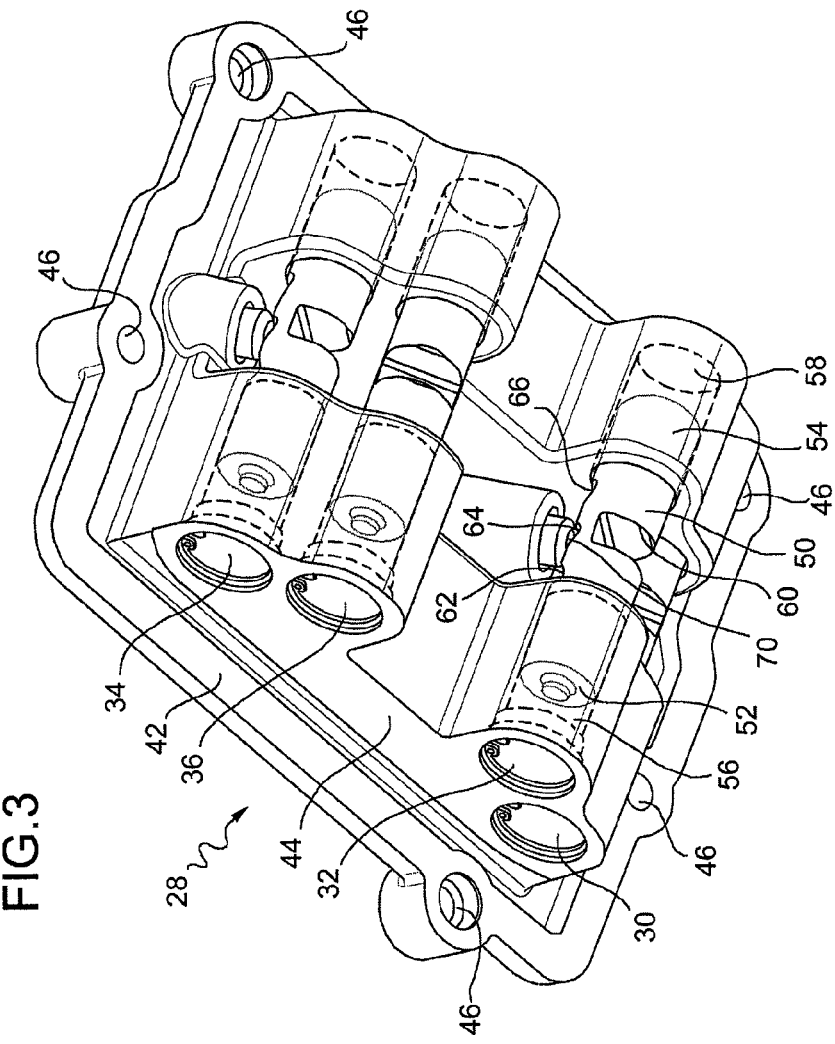

The operating unit 28 of the control device is shown in detail in FIG. 3. With reference to that figure, the operating unit 28 includes a support plate 42 and an actuator block 44, advantageously integrated to form a single body. The support plate 42 has holes 46 which can be brought into alignment with corresponding holes 48 provided in the gear case 16 (FIG. 2) for fixing the operating unit 28 to the gear case 16. The actuator block 44 accommodates the four hydraulic actuators 30, 32, 34 and 36, each of which is basically constituted by an elongated plunger 50 forming at its opposite ends first and second head portions 52 and 54, which are slidably and fluid-tightly arranged in first and second pressure chambers 56 and 58, respectively, provided in the actuator block 44. In its intermediate region between the head portions 52 and 54, the plunger 50 of each hydraulic actuator has a recess 60 on its cylindrical side surface and, in the diametrically opposite position, three equally-spaced positioning indentations 62, 64 and 66. For ease of illustration, reference numerals 50 to 66 are represented in FIG. 3 only in connection with the hydraulic actuator 32. In the recess 60 of the plunger 50 of each hydraulic actuator 30-36 engages a nose 68 of the shift fork 20-26 associated to that actuator, in such a manner that the translation movement of each hydraulic actuator is transmitted to the associated shift fork. The recesses 60 of the plungers 50 of the four hydraulic actuators 30, 32, 34 and 36 are arranged, in the neutral middle position, in a single selection plane corresponding to the selection plane of the gearshift lever in the manual version of the gearbox.

A hydraulic control circuit (not shown) is arranged to supply pressurised fluid to the pressure chambers 56 and 58 of the four hydraulic actuators 30, 32, 34 and 36 or to vent these latter so as to bring about every time the disengagement of the engaged gear or the engagement of a different gear depending on the commands directly imparted by the driver or by an electronic control unit of the transmission. By supplying pressurised fluid to the chamber 56 of a hydraulic actuator and venting the other chamber 58 the respective plunger 50 is caused to move to the right (relative to the observer of FIG. 3) in a first engagement position, whereas by supplying pressurised fluid to the chamber 58 and venting the chamber 56 the plunger 50 is caused to move to the left in a second engagement position. A neutral middle position corresponding to the idling condition is further provided for each plunger 50.

With reference again to FIG. 3, a snap-locking device is associated to the plunger 50 of each hydraulic actuator and is provided with a position-marking ball 70 arranged to engage alternatively in one of the three positioning indentations 62, 64 and 66 in order to hold the plunger 50 in the neutral middle position (middle indentation 64) or in one of the two engagement positions (side indentations 62 and 66).

Moreover, each hydraulic actuator integrates a position sensor (not shown) adapted to provide an electronic control unit (also not shown) with a position signal for the closed-loop position control of the actuator itself.

Figure 4:
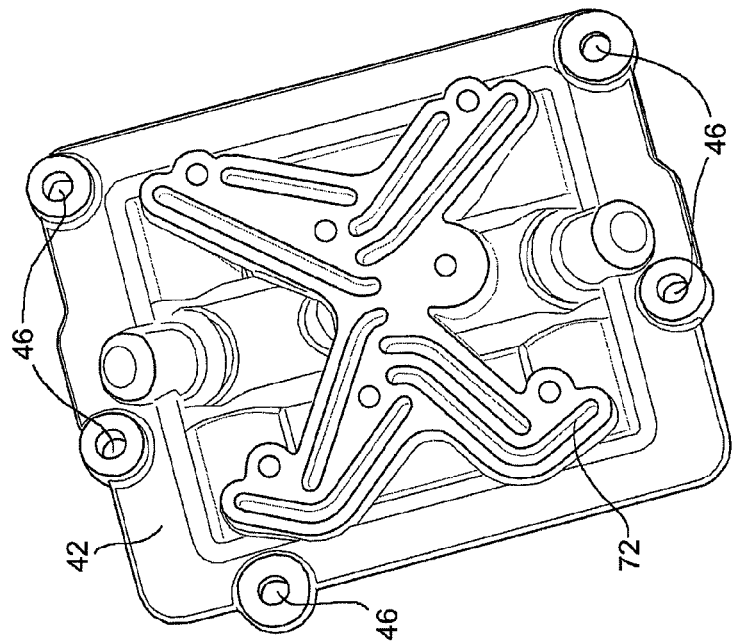
FIGS. 3 and 4 are perspective views from below and from above, respectively, of an operating unit for the control device of FIG. 1.

The upper side (facing towards the outside of the gearbox) of the support plate 42 of the operating unit 28 can be seen in the perspective view of FIG. 4, on which side a labyrinth 72 is formed in order to provide the connections between the hydraulic control circuit and the pressure chambers 56 and 58 of the actuators 30, 32, 34 and 36, which chambers are arranged on the opposite side of the support plate 42, i.e. towards the inside of the gearbox.

In view of the foregoing description, the advantages offered by the servo-assisted gearshift control device according to the present invention becomes apparent.

First of all, the use of only four hydraulic actuators allows to minimize the number of components of the control device.

Secondly, the hydraulic actuators are identical to each other and are controllable independently of each other, which allows to bring about non-sequential gear changes in "powershift" mode, i.e. with simultaneous engagement of two gears.

Moreover, the hydraulic actuators of the operating unit are arranged on the side of the support plate facing towards the inside of the gear case, which allows to minimize the outer overall size of the operating unit. hindrance In addition, since in the neutral position the recesses of the plungers of the hydraulic actuators, in which the noses of the shift forks engage, are arranged in a single selection plane and the support plate of the operating unit can be fixed to the same attachment portion as the one provided on the gear case in the manual version of the gearbox, the operating unit of the servo-assisted gearshift control device according to the invention can be used as such to convert a motor-vehicle dual-clutch transmission into the corresponding robotized single-clutch version and also allows to maintain the same gear case and the same shift forks when converting a motor-vehicle dual-clutch transmission into a manual single-clutch transmission. It is not therefore necessary to modify either the gear case or the shift forks with the respective noses in order to convert the dual-clutch version into the single-clutch version. Since the dual- and single-clutch versions can share some of the components of the servo-assisted gearshift control device, significant cost-savings are obviously achieved.

Finally, since a snap-locking device adapted to hold the respective plunger in the neutral middle position or in one of the two engagement positions is associated to each hydraulic actuator, it is possible to avoid additional machining operations and additional parts on the gear case and on the shift forks.

Naturally, the principle of the invention remaining unchanged, the embodiments and constructional details may vary widely with respect to those described and illustrated purely by way of non-limiting example.

For example, even though the description refers to shift forks slidably mounted on stationary rods, the invention is also applicable to a servo-assisted gearshift control device having shift forks secured to slidable support rods.

What is claimed is:

1. A servo-assisted gearshift control device for a motor-vehicle dual-clutch transmission including a gearbox with six or seven forward gears and reverse gear housed in a gear case, the device comprising:

four shift forks each slidable among a first engagement position, a second engagement position and an intermediate neutral position between the two engagement positions, and an operating unit comprising four double-acting hydraulic actuators identical to each other and arranged to control each the displacement of a respective shift fork among said first and second engagement positions and said neutral position;

wherein each hydraulic actuator comprises an elongated plunger having a recess on its cylindrical side surface and wherein each shift fork comprises a nose engaging in the recess of the plunger of a respective hydraulic actuator, whereby the translational movement of each hydraulic actuator is transmitted to the associated shift fork.

2. A control device according to claim 1, wherein the operating unit further comprises a support plate having fixing means for fixing to the gear case as well as an actuator block accommodating the hydraulic actuators, the support plate and the actuator block being integrated to form a single body.

3. A control device according to claim 2, wherein the actuator block is disposed on the side of the support plate facing towards the inside of the gear case in the assembled condition of the operating unit on the gear case.

4. A control device according to claim 1, wherein in the neutral position the recesses of the plungers of the hydraulic actuators are disposed in a single plane.

5. A control device according to claim 1, wherein the plunger of each hydraulic actuator further has three positioning indentations and wherein the operating unit further comprises, for each hydraulic actuator, a snap-locking device provided with a position-marking ball adapted to engage alternatively in one of said positioning indentations to hold the respective shift fork in the neutral position or in one of the two engagement positions.

6. A control device according to claim 1, wherein the plunger of each hydraulic actuator forms at its opposite ends first and second head portions and wherein the actuator block has, for each hydraulic actuator, first and second pressure chambers in which said first and second head portions, respectively, are slidably and fluid-tightly mounted.

7. A control device according to claim 6, wherein a labyrinth for connection of the pressure chambers of the hydraulic actuators with a hydraulic control circuit is provided on the side of the support plate facing outwards in the assembled condition on the gear case.

8. A dual-clutch transmission for a motor-vehicle, in particular a transmission with six or seven forward gears and reverse gear, including a servo-assisted gearshift control device according to claim 1.

* * * * *